United States Patent
Yu et al.

(10) Patent No.: US 7,794,514 B2
(45) Date of Patent: Sep. 14, 2010

(54) TWO-STAGE GASIFICATION APPARATUS COUPLED WITH HEAT RECOVERY AND WASHING AND ITS APPLICATIONS

(75) Inventors: Zunhong Yu, Shanghai (CN); Yifei Wang, Shanghai (CN); Guangsuo Yu, Shanghai (CN); Fuchen Wang, Shanghai (CN); Xueli Chen, Shanghai (CN); Zhenghua Dai, Shanghai (CN); Xiaolei Guo, Shanghai (CN); Qinfeng Liang, Shanghai (CN); Weifeng Li, Shanghai (CN); Xin Gong, Shanghai (CN); Haifeng Liu, Shanghai (CN)

(73) Assignee: East China University of Science & Technology, Shanghai (CN)

( * ) Notice: Subject to any disclaimer, the term of this patent is extended or adjusted under 35 U.S.C. 154(b) by 474 days.

(21) Appl. No.: 11/953,677

(22) Filed: Dec. 10, 2007

(65) Prior Publication Data
US 2008/0148634 A1    Jun. 26, 2008

(30) Foreign Application Priority Data
Dec. 12, 2006    (CN) .................... 2006 1 0119514

(51) Int. Cl.
    *C10J 3/48*    (2006.01)
(52) U.S. Cl. .............................. 48/77; 48/62 R; 48/67; 48/73
(58) Field of Classification Search ......... 48/62 R–62 A
    See application file for complete search history.

(56) References Cited

U.S. PATENT DOCUMENTS

| | | |
|---|---|---|
| 2,871,114 A | 1/1959 | Eastman |
| 4,110,359 A | 8/1978 | Marion |
| 4,197,281 A | 4/1980 | Muenger et al. |
| 4,228,604 A | 10/1980 | Cherian |
| 4,251,228 A | 2/1981 | Muenger et al. |
| 4,710,202 A * | 12/1987 | Gohler et al. .................. 48/73 |
| 4,889,540 A * | 12/1989 | Segerstrom et al. ............ 48/77 |
| 4,919,688 A * | 4/1990 | Suggitt et al. .................. 48/69 |
| 2002/0095866 A1 * | 7/2002 | Hassett .................. 48/199 FM |

(Continued)

FOREIGN PATENT DOCUMENTS

CN    86103455    11/1986

(Continued)

*Primary Examiner*—Basia Ridley
*Assistant Examiner*—Imran Akram
(74) *Attorney, Agent, or Firm*—Blank Rome LLP

(57) ABSTRACT

A two-stage gasification apparatus coupled with heat recovery and washing includes a columnar shell (7), an entrained flow gasification chamber (1), a fixed bed gasification chamber (18), a waste heat boiler (19) and a gas cooling-washing chamber (14) set coaxially from top to bottom inside the columnar shell (7). Process nozzle chambers (3) are set at a sidewall and/or a top of the entrained flow gasification chamber (1), and process nozzles (2) are set in a nozzle chambers (3). A feed-in lock hopper (25) is set and a fixed bed gasification chamber (18). An eccentric grate (10) is set in the middle of a lower part of the fixed bed gasification chamber (18), and the grate is connected with an ash-pan (11), which is conjoined with a motor (36) via transmission mechanism. An inverse cone (22) is erected at an upper part of a cooling-washing chamber (14).

10 Claims, 1 Drawing Sheet

U.S. PATENT DOCUMENTS

2008/0047198 A1* 2/2008 Mehlhose et al. ............. 48/210
2008/0141588 A1* 6/2008 Kirchhubel et al. ............ 48/77
2008/0172941 A1* 7/2008 Jancker et al. ................. 48/73

FOREIGN PATENT DOCUMENTS

| CN | 88102581 | 11/1988 |
| CN | ZL 95111750.5 | 7/2000 |
| CN | ZL 98110616.1 | 2/2001 |
| CN | ZL 200420114032.6 | 2/2006 |
| CN | ZL 200410067212.8 | 10/2006 |
| DE | 3714915 | 11/1988 |
| EP | 0290087 | 11/1988 |

* cited by examiner

TWO-STAGE GASIFICATION APPARATUS COUPLED WITH HEAT RECOVERY AND WASHING AND ITS APPLICATIONS

This application claims priority to Chinese Application No. 2006-10119514.4, filed Dec. 12, 2006, the contents of which is hereby incorporated by reference.

FIELD OF THE INVENTION

This invention relates to a gasification apparatus, and more specifically to a gasification apparatus for the gasification of mixtures comprising hydrocarbons.

BACKGROUND OF THE INVENTION

With the development of the society, energy and environment problems have been the bottlenecks to the society's progress. People do a lot of work on environment protection and energy efficiency. Entrained flow coal gasification is becoming increasingly popular world wide in the past 30 years. Based on this technology, IGCC (Integrated gasification combined cycle) electricity generation technology was engendered. Compared with the traditional technology of electricity generation, it made great progress in energy efficiency and environment protection. Representative IGCC technologies based on coal gasification in the world are, e.g., the Tampa power plant which adopts the GE (formerly Texaco) gasification technology and the Beggenum power plant which adopts the Shell gasification technology. The GE technology has been disclosed in patent documents (U.S. Pat. Nos. 4,228,604, 4,251,228, 2,871,114, 4,110,359, 4,197,281), and the Shell technology has been disclosed in patent documents (DE.P. 3714915.6 (China publication number 88102581), U.S. Pat. No. 738,727 (China publication number 86103455)).

It is well known that the GE (formerly Texaco) and Shell gasification technologies made great progress in environment protection and energy efficiency compared with other gasification technologies. Especially in environment protection, where their excellent performance indexes can be observed. But they also have some deficiencies. For example, the GE technology adopts a quench process and its cold gas efficiency is only about 70% to 73%, which is not suitable for electricity generation. The Shell technology adopts a waste heat boiler process and its cold gas efficiency is about 78%, better than the GE technology; however, the adoption of waste heat boilers and Ceramics Filters and so on leads to a higher cost of about twice of the investment of the GE technology. So a more efficient gasification technology with a simple apparatus and a short process is highly expected in the industry.

SUMMARY OF THE INVENTION

The present invention is to disclose a two-stage gasification apparatus integrated with heat recovery and washing as well as its applications in order to overcome the above-mentioned problems in the prior art and to meet the needs in the industry.

The concept of this invention is as follows:

Hot coal gas from the entrained flow gasifier that is fed in slurry will be taken as an example. The hot gas comprises $H_2O$ (g) about 12 to 14%, $H_2$ about 33% to 34%, CO about 39% to 41%, $CO_2$ about 13% to 15% and other trace components such as $H_2S$, $NH_3$, $N_2$, Ar, etc., and its temperature is about 1350° C. Since the GE technology adopts the quench process that changes the gas sensible heat into liquid water, it has no more use besides the shift reaction (The Shell technology quenches the hot gas from about 1600° C. to 900° C. by cycle compressed synthesis gas and then feeds the hot gas to the boiler which generates 3.0 MPa steam for electricity generation). In this invention, the hot gas is fed into a fixed bed gasifier to carry out further gasification reactions:

$$C+H_2O \rightarrow CO+H_2 \quad \Delta H=131\times 10^3 \text{ KJ/Kmol} \quad (1)$$

$$C+CO_2 \rightarrow CO \quad \Delta H=173\times 10^3 \text{ KJ/Kmol} \quad (2)$$

The sensible heat of hot gas is shifted to chemical energy and stored in the gas, wherein the $H_2O$(g), $CO_2$ can also be raw materials for gasification, and thus be fully used. The cold gas efficiency can be increased to about 84% to 86% without adding oxidant such as $O_2$ in the gasification process at the second stage, and the corresponding dry gas components are: $H_2$ about 36% to 40%, CO about 45% to 49%, $CO_2$ about 11% to 12%.

The apparatus of two-stage gasification coupled with waste heat boiler and washing-cooling chamber proposed by the present invention includes: a columnar shell, an entrained flow gasification chamber set coaxially from top to bottom inside the shell, a fixed bed gasification chamber, a waste heat boiler and a gas cooling-scrubbing chamber Process nozzle chambers are set around and/or at the top of the entrained flow gasification chamber, and process nozzles are set in the process nozzle chambers. The process nozzles set around the entrained flow gasification chamber are parallel to the horizontal plane or at an angle of approximately 1 to 10 degrees. The materials comprising hydrocarbons entering the process nozzles may be gas, liquid or solid (slurry or pulverized). The process nozzles located in the heating nozzle chamber, which is in the center of the top of the entrained flow gasification chamber, have axial lines parallel to or coincide with that of the entrained flow gasification chamber, and are used to increase the gasifier's temperature. When heating is stopped, the nozzle will be pulled out and replaced with a gasifier plug which is made of refractory material.

A feed lock hopper that is connected to the fixed bed gasification chamber by a feed channel is set up at the joint of the entrained flow gasification chamber and the fixed bed gasification chamber.

An eccentric grate with water-cooled jacket is set in the middle of the lower part of the fixed bed gasification chamber. The grate is connected with an ash-pan, which is conjoined with an electric motor via a transmission mechanism. When the electric motor operates, it will drive the ash-pan to revolve, which in turn drives the eccentric grate. On the ash-pan, there are an ash scrubber and slag outlet pores. Below the ash-pan, there is a slag channel at whose inlet an ash blower is set. The ash blower is connected with the high pressure $N_2$ pipe in order to blow away the gathering ashes that stick to the slug channels.

The fixed bed reaction chamber and the columnar shell of the waste heat boiler both are provided with water-cooled jackets.

An inverse cone is erected at the upper part of the cooling-washing chamber, and a washing-cooling water distributor through which the water enters the cone is seated at the top of the cone. At the bottom of the cone a gas duct is inserted into the cooling-washing chamber. Bubble breaking plates are set between inside the cooling-washing chamber and outside the gas duct. These bubble breaking plates are fixed at the inner side of the shell by brackets and have interspaces with the exterior of the gas duct. These bubble breaking plates are to break up big bubbles and enhance the effect of both gas-liquid contact and washing. In the upper part of the cooling-washing chamber, there is a gas outlet. In the lower part of the washing-cooling chamber, there is a black water outlet, and at the bottom of the washing-cooling chamber a slag water outlet is set.

The apparatus of the present invention can be used to gasify the gas, liquid or solid (slurry or pulverized) materials comprising hydrocarbons. The entrained flow gasification chamber is principally used to gasify the gas, liquid or solid (slurry or pulverized) materials comprising hydrocarbons, and the fixed bed gasification chamber is mainly used to gasify the solid hydrocarbon material such as coal chars.

The process flow is as follows:

Hydrocarbons such as coal enter the entrained flow gasification chamber through process nozzles after being processed. Combustion and gasification reactions are completed in this chamber, with the temperature at the outlet being about 1200° C. to 1700° C. Hydrocarbons then enter the fixed bed gasification chamber to undergo the gasification reaction again. The sensible heat of the coal gas provides the heat that the reactions need, and reacting agents are the $CO_2$, $H_2O$ (g) in the coal gas from the entrained flow outlet.

The hydrocarbon material (such as coal) in gas state or in slurry or pulverized state with particle sizes under 200 μm is fed to the process nozzles. High-pressure pumps are used to transport the slurry hydrocarbons, or the dry pulverized hydrocarbons are fed by carrier gas such as $N_2$ or $CO_2$. Meanwhile, the gasification agents also enter the process nozzles to be mixed together, and spray out of the nozzles at a rate of 30 to 200 m/s. Impinging streams are formed via opposed multiple nozzles which incline slightly downwards to enhance diffusion and mixing. The atomized or dispersed hydrocarbons then enter the entrained flow gasification chamber to be gasified into coal gas.

The solid hydrocarbon materials such as coal chars out of the feeding lock hopper enter the fixed bed gasification chamber, meeting with the ash-slag and the hot gas from the outlet of the entrained flow gasification chamber at the top and completing the second chemical reaction. The coal gas, with its temperature dropped down to about 900° C., enters the waste heat boiler. The coal gas out of the waste heat boiler and the ash-slag from the ash channels go through the ash-scrubbing process by the grate and then enter the cooling-washing chamber through the ash discharging channel, where dedusting and cooling are further carried out. Then the coal gas enters the next procedure for further cleaning and the ashes are discharged. The gray water is recycled after heat recycling treatment and the coarse slag are removed from the gasifier through a slag disposal device. Black water from the black water outlet of the gasifier enters the downstream water treatment process.

The operating pressure of the above-mentioned apparatus is about 0.1 MPa to 12 MPa. The operating temperature of the entrained flow gasification chamber is about 1200° C. to 1700° C., and the temperature at the outlet of the fixed bed gasification chamber is about 900° C. The outlet temperature of the synthesis gas from the waster heat boiler is approximately 300° C.

Compared with the gasifiers disclosed in the prior art, this reactor has some notable advantages: without using additional oxidants (for example oxygen), the sensible heat of the hot gas from the entrained flow gasification chamber is shifted to chemical energy and stored in the gas products. Since $CO_2$ and steam undergo further reaction with the coal gas, they are fully used and the cold gas efficiency can reach 84% to 86%. Also, because of its simple and compact structure, low investment and easy operation, the apparatus of the present invention is especially fit for systems of IGCC electricity generation and systems without downstream shift processes.

DETAILED DESCRIPTION OF THE EMBODIMENTS

Figure 1:
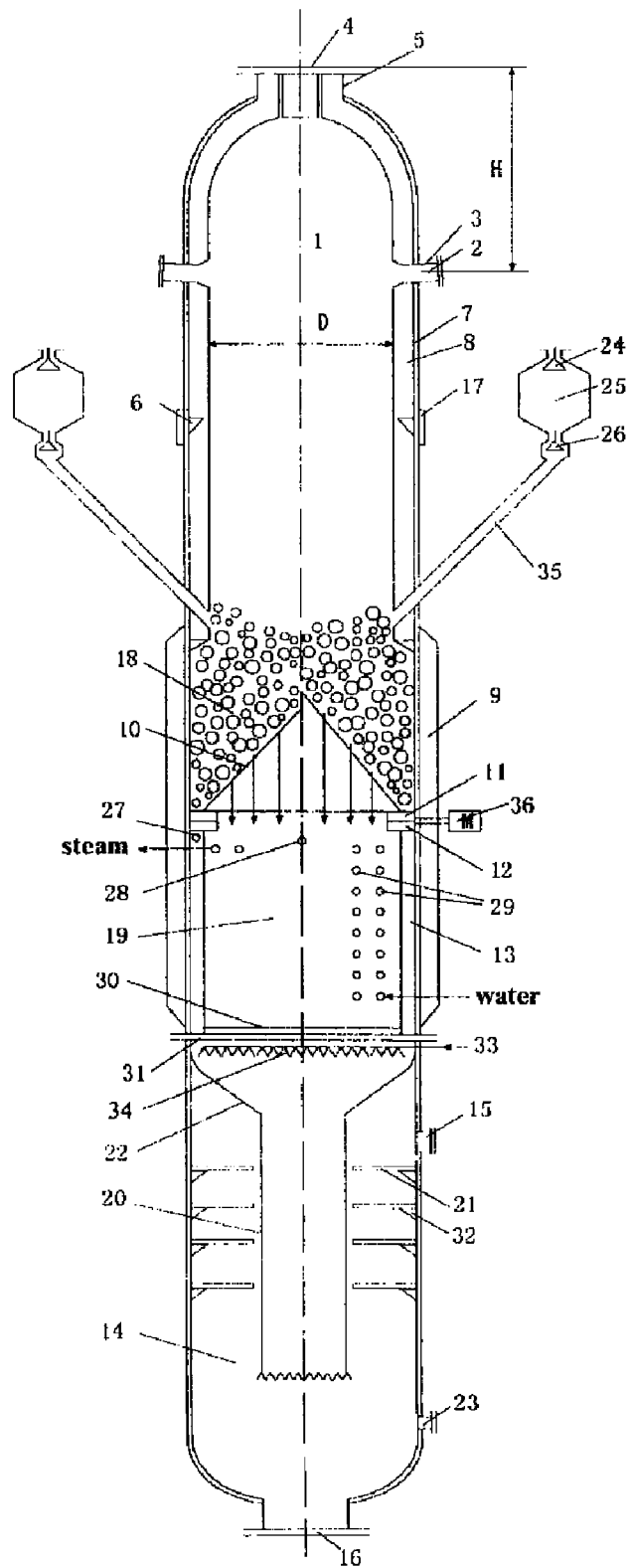
FIG. 1 is an apparatus of two-stage gasification coupled with a waste heat boiler and a cooling-scrubbing chamber

With reference to FIG. 1, the present invention provides an apparatus of two-stage gasification coupled with a waste heat boiler and a cooling-washing chamber, including: a columnar shell 7, an entrained flow gasification chamber 1 set coaxially from top to bottom inside the columnar shell 7, a fixed bed gasification chamber 18, a waste heat boiler 19 and a gas cooling-washing chamber 14.

According to FIG. 1, a refractory lining 8 is installed on the inner side of the shell 7 of the entrained flow gasification chamber 1. The refractory lining 8 may be a type of cold water wall or hot wall which forms the volume that is the entrained flow gasification chamber 1. The above-mentioned the type of hot wall, as the refractory lining 8 is described in detail in patent ZL200410067212.8. In FIG. 1, there is a hot wall refractory lining S that is described in detail in patent ZL98110616.1. When a hot wall refractory lining 8 is adopted, brick-holding brackets 6 are set in the hot wall refractory lining 8 to support it. The number of layers of the brick-holding brackets is 1 to 4, and the peripheries of the brick-holding brackets are wrapped by refractory fibers. Strip-shaped radiators 17 are set outside of the shell where the brick-holding bracket 6 is set, with each brick-holding bracket corresponding to one strip-shaped radiator. The strip-shaped radiator and the brick-holding bracket are of the same height.

With reference to FIG. 1, process nozzle chambers 3 are set at the sidewall and/or the top of the entrained flow gasification chamber 1, and process nozzles 2 are set in the process nozzle chambers. The process nozzle chambers 3 and the process nozzles 2 are coaxial, and the axe of the process nozzle 2 which is set up at the top of the entrained flow gasification chamber 1 parallels to or coincides with the axe of the entrained flow gasification chamber. The number of the process nozzle chambers 3 is about 1 to 20. The distance from the process nozzles 2 around the entrained flow gasification chambers 1 to the top of the entrained flow gasification chamber 1 is H, which equals to 1D to 2D, where D is the interior diameter of the entrained flow gasification chamber 1. The process nozzles 2 are distributed by pairs in opposing positions and the process nozzles 2 around the entrained flow gasification chamber 1 are parallel to the horizontal plane or at an angle of approximate 1 to 10 degrees. The materials comprising hydrocarbons entering the process nozzles may be gas, liquid or solid (slurry or pulverized). The process nozzle 4 located in the heating nozzle chamber 5 that is in the center of the top of the entrained flow gasification chamber is to increase the gasifier's temperature. The nozzle will be pulled out and replaced with a gasifier plug when heating is stopped. The gasifier plug is made of refractory material and includes a cooling coil inside. The said process nozzles 2 refer to nozzles having several passages. Different kinds of gasification nozzles can be used, such as internal mixing or external mixing type. If slurry hydrocarbons materials are used, the technology disclosed in patent ZL95111750.5 may be employed. While the materials are pulverized hydrocarbons, the technology disclosed in patent ZL200420114032.6 may be adopted. The objective of this invention can also be achieved by using other nozzles.

Referring to FIG. 1, a feed lock hopper 25 is set up at the joint of the entrained flow gasification chamber 1 and the fixed bed gasification chamber 18. Check valves 24, 26 are set on both sides of the feed lock hopper 25 in order to control the feeding process of the lock hopper 25. The feed lock hopper 25 is connected to the fixed bed gasification chamber 18 by a feed channel 35. Preferably, the entrained flow gasification chamber 1 can be connected with the fixed bed gasification chamber 18 by a flange 31.

Referring to FIG. 1, the eccentric grate with water-cooled jacket 10 is set in the middle of the lower part of the fixed bed gasification chamber 18. The grate 10 is connected with the ash-pan 11, which is conjoined with the electric motor 36 via transmission mechanism. When the motor 36 operates, it will drive the ash-pan 11 to revolve, which in turn drives the grate 10. Preferably, teeth will be set around the ash-pan 11 that engage gears 12, and the gears 12 connect to the electric motors 36. On the ash-pan 11, there are an ash scrubber and slag outlet pores. Below the ash-pan 11, there is a slag channel 13 at whose inlet an ash blower 27 is set. The ash blower 27 is connected to a high pressure $N_2$ pipe in order to blow away the gathering ashes that stick to the slug channel.

Referring to FIG. 1, there are grilles 30 set inside the waste heat boiler 19. The pipes of water-tube boiler 29 are installed on the grilles 30. Boiler water enters from the bottom of the boiler and steam vents out of the top. On the water pipes 29, there is a water-tube boiler ash blower 28, which is connected to the high-pressure $N_2$ pipe to blow away fine aches sticking to the ash channels.

Referring to FIG. 1, both the fixed bed gasification chamber 18 and the columnar shell 7 of the waste heat boiler 19 have water-cooled jackets 9.

Referring to FIG. 1, an inverse cone 22 is erected at the upper part of the cooling-washing chamber 14, and a washing-cooling water distributor 34 through which the water enters into the cone is seated at the top of the cone 22. A gas duct 20 is set below the cone 22 and is inserted into the cooling-washing chamber 14. The cooling-washing chamber 14 is preferably connected with the waste heat boiler 19 by the flange 31. Bubble breaking plates 21 are set between inside the cooling-washing chamber 14 and outside the gas duct 20. The bubble breaking plates 21 are fixed at the inner side of the shell 7 by brackets 32 and have interspaces with the exterior of the gas duct 20. The bubble breaking plates 21 are to break up big bubbles and enhance the effect of both gas-liquid contact and washing. At the upper part of the cooling-washing chamber 14, there is a gas outlet 15. At the lower part of the washing-cooling chamber 14 a black water outlet 23 is set, and at the bottom of the washing-cooling chamber 14 a slag water outlet 16 is set.

EXAMPLE I

In this example, a gasification apparatus as shown in FIG. 1 is employed. And the entrained flow gasification reactor chamber uses hot wall refractory liner, with coal-water slurry as material.

In the preferred embodiment, the entrained flow gasification reactor chamber 1 gasifies at the pressure of 4.0 MPa. The entrained flow gasification reactor chamber has a total height of 9 m and an interior diameter of 2.7 m.

As for the fixed bed reactor chamber 18, its total height is 7.6 m, and its diameter is 3.8 m. As for the gas cooling-scrubbing chamber 14, its total height is 8 m, and its diameter is 3.8 m.

The process nozzles 2 are set around the entrained flow gasification reactor chamber 1. The distance between the process nozzles 2 and the top of the entrained flow gasification reactor chamber 1 is 4 m. The process nozzles 2 are distributed by pairs in opposing positions, and parallel to or have a 5 degrees angle with the horizontal plane. The process nozzles 2 employ the technology disclosed in patent ZL95111750.5 with multi-channels. The nozzles are set in one layer. Every layer has 4 nozzles.

The coal capacity of the entrained flow gasification reactor chamber 1 is 2000 tons per day, and the coal capacity of the fixed bed reactor chamber 18 is 300 tons per day.

The ultimate analysis of the adopted coal is as follows (wt %):

| | |
|---|---|
| C | 76.996 |
| H | 5.286 |
| N | 1.218 |
| S | 2.989 |
| O | 4.935 |
| ASH | 8.576 |

The adopted technologic condition is as follows:

The concentration of the coal-water slurry (quantity of solid contained) is 65.7%, and the density is 1174 kg/m$^3$. The oxygenic purity is 99% (volume). The gasification pressure is 4.0 MPa. Per ton coal needs an oxygen input of 677.3 Nm$^3$. The temperature of the gas out of the entrained flow gasification reactor chamber is 1345° C. The gas components in wet basis (volume) are: $H_2O$=12.33%, $H_2$=33.58%, CO=39.31%, $CO_2$=13.16%, $H_2S$=0.76%, COS=0.04%, $CH_4$=0.1%, $NH_3$=0.18%, $N_2$+Ar=0.54%, and the rate of carbon conversion is 98%, and the cool gas efficiency is 75.5% (HHV).

The gas and the ash residue coming out of the entrained flow gasification reactor chamber meet with the coal of the fixed bed reactor chamber on the top, and accomplish the second chemical reaction, with the ash residue being held up in the fixed bed reactor chamber. The temperature of the gas is 1345° C. before entering the fixed bed reactor chamber, and the gas contains water steam of 0.323 Nm$^3$/kg, $CO_2$ of 0.345 Nm$^3$/kg, so no substance needs to be added into the fixed bed reactor chamber. The temperature of the gas entering the waste heat boiler from the grate of the fixed bed reactor chamber is 900° C., and the pressure is about 3.6 MPa, the gas components (in dry basis) are: $H_2$=39.37%, CO=47.65%, $CO_2$=10.22%, $H_2S$=0.76%, COS=0.04%, $CH_4$=1.12%, $N_2$+Ar=0.55%, and $NH_3$+HCN=0.21%. The cool gas efficiency is 84.1% (HHV), a 8.6 percent increase as compared with the entrained flow gasification reactor chamber. In the fixed bed reactor chamber, the rate of carbon conversion is 98%, the rate of steam conversion is 60%, and the rate of $CO_2$ conversion is 29.7%. Namely, 60% of the water steam and 29.7% of the $CO_2$ in the high temperature gas coming out of the entrained flow gasification reactor chamber take gasification reaction in the fixed bed reactor chamber, lowering the gas temperature down from 1345° C. to 900°, which consequently achieves the goal of recovering the sensible heat.

EXAMPLE II

In the entrained flow gasification reactor 1, the gasification pressure is 4.0 MPa, its total height is 8.5 m, and its interior diameter is 2.5 m.

As for the fixed bed reactor chamber 18, its total height is 5 m, and its diameter is 2.5 m; as for the gas cooling-scrubbing chamber 14, its total height is 7.5 m, and its diameter is 2.5 m.

Process nozzles 2 are set at the sidewall and the top of the entrained flow gasification reactor chamber 1. The distance between the process nozzles 2 and the entrained flow gasification reactor chamber 1 is 3.7 m. The process nozzles 2 are set by pairs in opposing positions, and are parallel to or at an angle of 8 degrees with the horizontal plane. The process nozzles 2 employ the technology disclosed in the patent ZL200420114032.6 with multi-channels. The nozzles are set in one layer. Every layer has 4 nozzles.

The coal capacity of the entrained flow gasification reactor chamber 1 is 2000 tons per day, and the coal capacity of the fixed bed reactor chamber 18 is 200 tons per day. The entrained flow gasification reactor chamber is fed with dry pulverized coal, and adopts cool-wall refractory liner.

The coal genus is the same as in example 1, and the coal entering the furnace includes 2% of water by weight, and its oxygenic purity is 95%, the oxygen-coal ratio is 0.650 $Nm^3$/kg, the steam-oxygen ratio is 0.1974 $kg/Nm^3$. The temperature of the gas out of the entrained flow gasification reactor chamber is 1345° C., the rate of carbon conversion is 99%, the gas components in wet basis (volume) are: $H_2$=28.77%, $CO$=58.35%, $CO_2$=2.76%, $H_2S$=0.85%, $COS$=0.07%, $CH_4$=0.01%, $N_2$=3.16%, $NH_3$=0.19%, and $H_2O$=4.96%, and the cool gas efficiency is 80.5% (HHV).

With no oxidant, such as $O_2$, being added, the gas and the ash residue coming out of the entrained flow gasification reactor chamber meet with the coal of the fixed bed reactor chamber on the top, and accomplish the second chemical reaction, with the ash residue being held up in the fixed bed reactor chamber. The temperature of the gas entering the waste heat boiler from the grate of the fixed bed reactor chamber is 900° C. In the fixed bed reactor chamber, the rate of carbon conversion is 98%, the rate of steam conversion is 69%, and the rate of $CO_2$ conversion is 19.6%. The gas components (in dry basis) are: $H_2$=32.08%, $CO$=59.03%, $CO_2$=2.29%, $H_2S$=0.89%, $COS$=0.05%, $CH_4$=1.82%, $N_2$=2.85%, $Ar$=0.78%, and $NH_3$+$HCN$=0.21%. The cool gas efficiency is 86.1% (HHV), a 5.6 percent increase as compared with the entrained flow gasification reactor chamber.

The contents of ZL200410067212.8, ZL98110616.1, ZL95111750.5 and ZL200420114032.6 are hereby incorporated by reference.

What is claimed is:

1. A two-stage gasification apparatus coupled with heat recovery and washing, the apparatus comprising:
    a columnar shell;
    an entrained flow gasification chamber, a fixed bed gasification chamber, a waste heat boiler and a gas cooling-washing chamber set coaxially from top to bottom inside the columnar shell;
    process nozzle chambers are set at a sidewall and/or a top of the entrained flow gasification chamber, and process nozzles are set in the process nozzle chambers, the process nozzle chambers and the process nozzles are coaxial, and axes of the process nozzles are set at the top of the entrained flow gasification chamber parallel to or to coincide with axes of the entrained flow gasification chamber, and the process nozzles are set at the sidewall of the entrained flow gasification chambers are parallel to a horizontal plane or at an angle of 1 to 10 degrees;
    a feed-in lock hopper is set at a joint of the entrained flow gasification chamber and a fixed bed gasification chamber;
    a grate with non-symmetrical sides and a water-cooled jacket is set in the middle of a lower part of the fixed bed gasification chamber, and the grate is connected with an ash-pan, which is conjoined with a motor via transmission mechanism; on the ash-pan, there is an ash scrubber and slag outlet pores, and below the ash-pan, there is a slag channel at whose inlet an ash blower is set;
    an inverse cone is located in an upper part of a cooling-washing chamber, and a washing-cooling water distributor through which water enters the cone is seated at a top of the cone, and a gas duct is set below the cone and is located in the cooling-washing chamber, and bubble breaking plates are set between an inside of the washing-cooling chamber and an outside of a gas duct, wherein the bubble breaking plates are fixed at an inner side of the shell by brackets and have interspaces with an exterior of the gas duct; at the upper part of the cooling-washing chamber, there is a gas outlet, and at a lower part of the cooling-washing chamber a black water outlet is set and at a bottom of the washing-cooling chamber a slag water outlet is set.

2. The two-stage gasification apparatus coupled with heat recovery and washing according to claim 1, wherein a refractory lining is set inside the shell of the entrained flow gasification chamber, and a volume formed by the refractory lining is the entrained flow gasification chamber.

3. The two-stage gasification apparatus coupled with heat recovery and washing according to claim 2, wherein the refractory lining is a type of hot wall or cool wall.

4. The two-stage gasification apparatus coupled with heat recovery and washing according to claim 3, wherein brick-holding brackets are set in the hot wall refractory lining, and the brick-holding brackets have one to four layers, and peripheries of the brick-holding brackets are wrapped with refractory fiber, and wherein strip-shaped radiators are set outside the shell where the brick-holding bracket is set.

5. The two-stage gasification apparatus coupled with heat recovery and washing according to claim 1, wherein if process nozzle chambers are located in the sidewall, then a number of the process nozzle chambers in the sidewall is 1 to 20, a distance from the process nozzles around the entrained flow gasification chambers to the top of the chambers is H, which equals to 1D to 2D, where D is an interior diameter of the entrained flow gasification chamber, and the process nozzles are set by pairs in opposing positions.

6. The two-stage gasification apparatus coupled with heat recovery and washing according to claim 1, wherein the process nozzles adopt multi-channel nozzles.

7. The two-stage gasification apparatus coupled with heat recovery and washing according to claim 1, wherein check valves are set on both sides of a feed lock hopper, and the feed lock hopper is connected to the fixed bed gasification chamber by a feed channel.

8. The two-stage gasification apparatus coupled with heat recovery and washing according to claim 1, wherein teeth are set around the ash-pan, and these teeth engage gears, and the gears are connected to the electric motor.

9. The two-stage gasification apparatus coupled with heat recovery and washing according to claim 1, wherein grilles are set inside a waste heat boiler, and pipes of water-tube boiler are installed on grilles; boiler water enters from a bottom of the boiler and water steam vents out of the top; on the water cooling pipes, there is a water-tube boiler ash blower that is connected to the high pressure $N_2$ pipe, and a columnar shell of both the fixed bed gasification chamber and the waste heat boiler has water-cooled jackets.

10. Application of the two-stage gasification apparatus coupled with heat recovery and washing according to claim 1, wherein the gasification apparatus is capable of being used to gasify gas, liquid or solid, slurry or pulverized materials comprising hydrocarbons.

* * * * *